(12) United States Patent
Gasendo

(10) Patent No.: US 8,522,903 B1
(45) Date of Patent: Sep. 3, 2013

(54) LONG DISTANCE ELECTRIC VEHICLE

(76) Inventor: Leonardo M. Gasendo, Camarillo, CA (US)

( * ) Notice: Subject to any disclaimer, the term of this patent is extended or adjusted under 35 U.S.C. 154(b) by 0 days.

(21) Appl. No.: 13/573,145

(22) Filed: Aug. 27, 2012

(51) Int. Cl.
*B60K 1/00* (2006.01)

(52) U.S. Cl.
USPC .......................................... 180/65.1

(58) Field of Classification Search
USPC ............................. 180/65.1–65.29
See application file for complete search history.

(56) References Cited

U.S. PATENT DOCUMENTS

| | | | |
|---|---|---|---|
| 7,687,931 B2 | 3/2010 | Gasendo | |
| 7,841,830 B1 | 11/2010 | Gasendo | |
| 7,931,435 B1 | 4/2011 | Gasendo | |
| 8,276,693 B2 * | 10/2012 | Scarbo et al. | 180/65.1 |

* cited by examiner

*Primary Examiner* — Jeffrey J Restifo
*Assistant Examiner* — Erez Gurari
(74) *Attorney, Agent, or Firm* — Richard S Erbe

(57) ABSTRACT

A long distance electric vehicle is provided with an onboard energy converter and an onboard energy recycler that will store large quantities of electric current into an onboard battery during transit thereby enabling said electric vehicle to travel 1,000 miles without exhausting the electrical charge of said onboard battery.

3 Claims, 2 Drawing Sheets

US 8,522,903 B1

LONG DISTANCE ELECTRIC VEHICLE

BACKGROUND OF THE PRESENT INVENTION

A conventional electric vehicle can travel 200 miles until it has to stop for four hours to recharge its exhausted onboard battery. The electric vehicle companies are spending millions of dollars to increase the travel range of the onboard battery without much success. Careful analysis reveals that large quantities of electric current from the onboard battery are consumed during long distance trips and large quantities of electric current are dissipated by the wheels to the ground in the form of friction heat.

SUMMARY OF THE PRESENT INVENTION

An object of the present invention is to provide an electric vehicle that will use the kinetic energy of the bouncing vehicle wheels for generating and storing large quantities of electric current into the onboard battery during transit.

Another object of the present invention is to provide an electric vehicle that will use the kinetic energy of the spinning vehicle wheel for storing large quantities of electric current into the onboard battery during transit.

Another object of the present invention is to provide an electric vehicle that will travel 1,000 miles without exhausting the electrical charge of the onboard battery during transit.

DESCRIPTION OF THE PREFERRED EMBODIMENT

Figure 1:
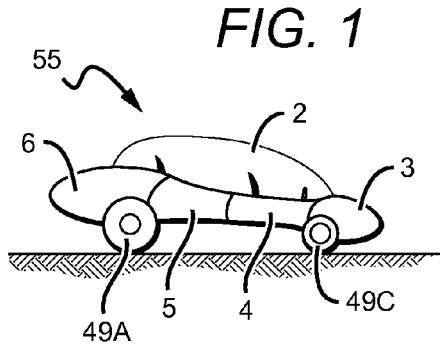
FIG. 1 illustrates the side view of the electric vehicle.
Figure 3:
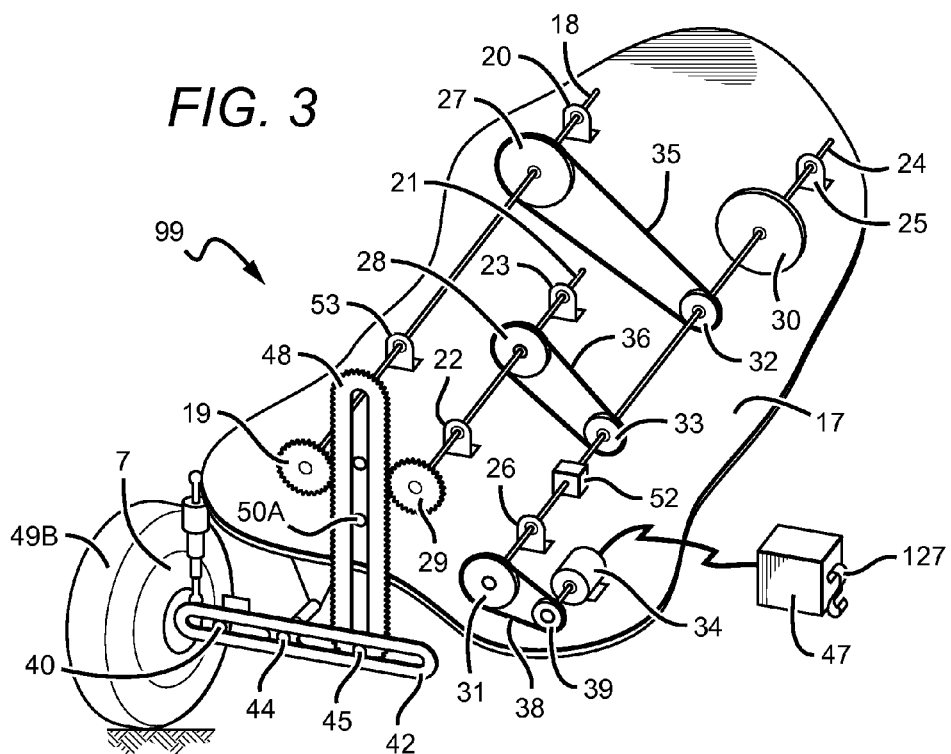
FIG. 3 illustrates the isometric view of the onboard energy converter.
Figure 4:
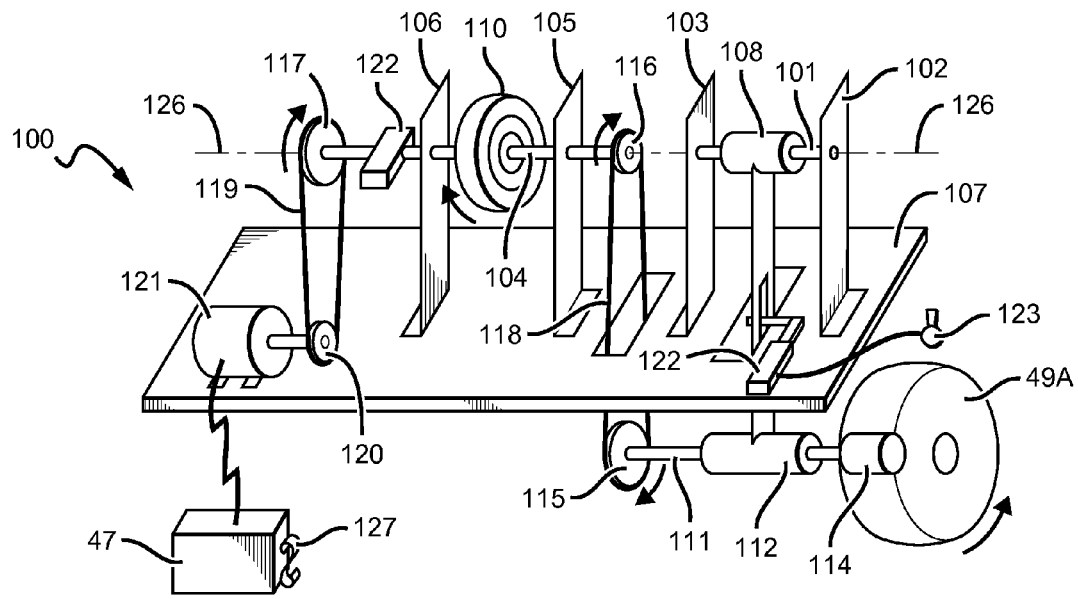
FIG. 4 illustrates the isometric view of the onboard energy recycler.

As shown in FIG. 1 the electric vehicle 55 is comprised of a body assembly 2 with conventional drive train, an energy converter 99 FIG. 3 and an energy recycler 100 FIG. 4 wherein the body assembly 2 is comprised of a battery compartment 3, a driver compartment 4, a passenger compartment 5, a trunk compartment 6, an onboard battery 47, platforms 17 and 107, four wheels 49A, 49B, 49C and 49D (not shown, but is implicit in the configuration of the vehicle and is located behind wheel 49C) and four shock absorbers 7. As shown in FIG. 1 the rear wheels 49A and 49B have greater diameter than the front wheels 49C and 49D in order to create a sloping downhill profile for good wheel traction and safe acceleration. A dashboard computerized instrumentation will indicate the changing road conditions during transit and preventive maintenance requirements.

By pressing a dashboard button, the front seats and back seats will rearrange into beds for sleeping. By pressing another dashboard button, the convertible roof will slide into the trunk compartment 6. The body assembly 2 is made of lightweight, durable bulletproof, bombproof materials including carbon fiber and Kevlar. The blast force of an IED will be dissipated to the rear and push the body 2 forward for safe acceleration. It should be understood that the drawings are for illustrative purposes only and the different methods of mounting the embodiments are within the abilities of a skilled mechanic.

Figure 2:
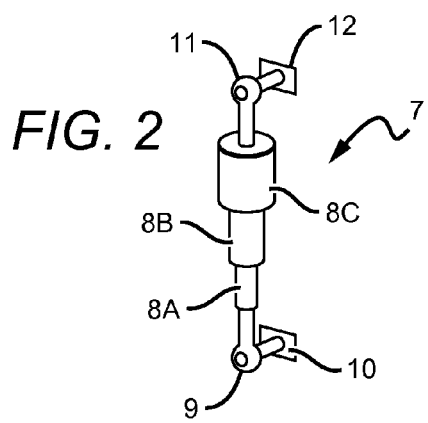
FIG. 2 illustrates the isometric view of the shock absorber.

As shown in FIG. 2 the shock absorber 7 is provided with a light duty shock absorber 8A, a medium duty shock absorber 8B and a heavy duty shock absorber 8C in which the ring holder 9 is secured to the roller pin anchor 10 that is secured to the wheel axle and the ring holder 11 is secured to the roller pin anchor 12 that is secured to the body 2 thereby producing a high bounce of the wheel 49B and a minuscule bounce of the body 2 during transit. Thus the shock absorber 7 connecting the wheel axle with the body 2 is responsible for the high production of electric current by the energy converter 99 without imparting any braking effect to the speeding electric vehicle 55. The horizontal roller pins shown in FIGS. 2, 4, 6, 7 and 8 are provided with lock nuts.

Figure 6:
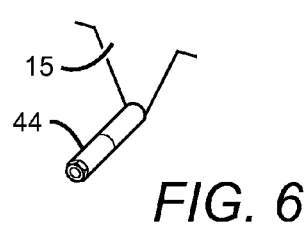
FIG. 6 is the isometric view of the V-support apparatus.
Figure 5:
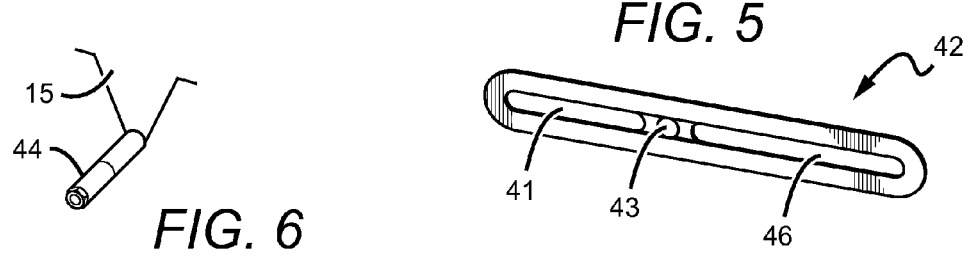
FIG. 5 is the isometric view of the lever arm apparatus.
Figure 7:
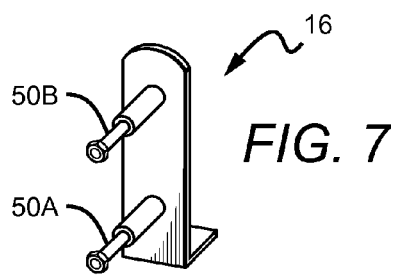
FIG. 7 is the isometric view of the vertical guide apparatus.
Figure 8:
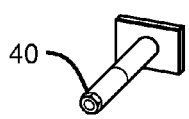
FIG. 8 is the isometric view of the roller pin apparatus.
Figure 9:
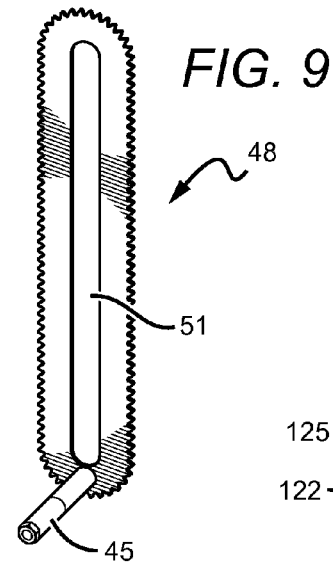
FIG. 9 is the isometric view of the saber toothed gear apparatus.

FIG. 3 shows the isometric view of the energy converter 99 wherein the anchor 14 with roller pin 40, FIG. 8 is mechanically secured to wheel 49B, the V-support 15, as best illustrated in FIG. 6, and the vertical guide 16, as best illustrated in FIG. 7, are secured to the platform 17. Platform 17 is secured to the body 2. As best seen in FIG. 3 the drive shaft 18 is rotatably supported through the bearing assemblies of the vertical supports 20 and 53 and the drive shaft 24 is rotatably supported through the bearing assemblies of the vertical supports 25 and 26. The drive shaft 21 is rotatably supported through the bearing assemblies of the supports 22 and 23. The drive pulley 27 is secured to the drive shaft 18 and the circular gear 19 with ratchet bearing assemblies is rotatably secured to the drive shaft 18; the drive pulley 28 is secured to the drive shaft 21 and the circular gear 29 with ratchet bearing assemblies is rotatably secured to the drive shaft 21; the flywheel 30 and the drive pulley 31 are secured to the drive shaft 24; the drive pulleys 32 and 33 with ratchet bearing assemblies are rotatably secured to the drive shaft 24.

As shown further in FIG. 3 the electric generator 34 is secured to the platform 17; the drive belt 35 is rotatably engaged with the drive pulleys 27 and 32; the drive belt 36 is rotatably engaged with the drive pulleys 28 and 33; and the drive belt 38 is rotatably engaged with the drive pulleys 31 and 39. As can best be seen in FIG. 3 the roller pin 40 extends horizontally through the opening 41 of the lever arm 42; the fulcrum 43 of the lever arm 42 is rotatably secured to the roller pin 44 of the V-support 15 and the roller pin 45 extends horizontally through the opening 46 of the lever arm 42. The circular gear 19 and circular gear 29 are intermeshed with the toothed gear 48. As shown in FIG. 3 the high bounces of the wheel 49B are enhanced by the lever arm 42 into long strokes of the toothed gear 48. The roller pins 50A and 50B that extend through the opening 51 of the toothed gear 48. will guide the toothed gear 48 to produce up and down strokes during transit.

Referring further to FIG. 3, as the toothed gear 48 moves upward it will rotate the circular gear 19, drive pulley 27 and electric generator 34 positively to produce electric current and at the same time rotate the circular gear 29 neutrally without affecting the rotation of the circular gear 19. As the toothed gear 48 moves downward it will rotate the circular gear 29, drive pulley 28 and electric generator 34 positively to produce electric current and at the same time rotate the circular gear 19 neutrally without affecting the rotation of the circular gear 29. The automatic transmission 52 will quickly trigger the generator 34 to 1800 rpm to produce electric current responsive to the high frequency bouncing motion of the wheel 49B during transit. Thus, the energy converter 99 will not impart any braking effect to the speeding electric vehicle 55.

FIG. 4 shows the isometric view of the energy recycler 100 wherein the drive shaft 101 is rotatably supported through the bearing assemblies of the vertical supports 102 and 103; the drive shaft 104 is rotatably supported through the bearing assemblies of the vertical supports 105 and 106. The drive shafts 101 and 104 are co-axially rotatable about the 126-126 axis. Also in FIG. 4 the supports 102, 103, 105 and 106 are secured to the platform 107. The fulcrum of the lever arm 108 is secured to the drive shaft 101 equidistant from the supports 102 and 103.

Also shown in FIG. 4 the flywheel 110 is secured to the drive shaft 104 equidistant from the supports 105 and 106. The drive shaft 111 is rotatably secured through the bearing assemblies of the lever arm holder 112 wherein the contactor 114 is secured to one end of the drive shaft 111 and the drive pulley 115 is secured to the other end of the drive shaft 111. The drive pulley 116 is secured to one end of the drive shaft 104 and the drive pulley 117 is secured to the other end of the drive shaft 104. As best seen in FIG. 4 the drive belt 118 is rotatably engaged with the drive pulleys 115 and 116; the drive belt 119 is rotatably engaged with the drive pulleys 117 and 120. The electric generator 121 is secured to the platform 107.

Figure 10:
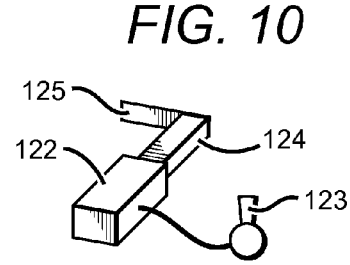
FIG. 10 is the isometric view of the solenoid apparatus.

As shown in FIG. 10 the solenoid 122 is secured to the platform 107. FIG. 4 shows that the spring 125 extends through the side opening of the lever arm 108. As the switch 123 is flicked to on-position the push rod 124 will push the lever arm 108 and engages the contactor 114 with the wheel 49A to extract kinetic energy. As the switch 123 is flicked to off-position the contactor 114 will disengage from the spinning wheel 49A. For optimum operation the switch 123 will reset automatically to on-position at cruising speed greater than 50 mph and will reset automatically to off-position at cruising speed lower than 50 mph. During transit the largest concentration of kinetic energy from the threaded surface of the wheel 49A will be extracted by the contactor 114 and stored as electric current into the onboard battery 47 via the flywheel 110 and generator 121.

The automatic transmission 122 will quickly trigger the generator 121 to 1800 rpm to produce electric current responsive the slightest movement of the contactor 114. As the contactor 114 rotates cooperatively with the spinning wheel 4A it will impart a minuscule braking effect to the speeding electric vehicle 55. Going downhill the energy converter 99 and energy recycler 100 will store massive quantities of electric current into the battery 47 with no consumption of energy. By working together the onboard energy converter 99 and energy recycler 100 will enable the electric vehicle 55 to travel 1,000 miles without exhausting the electrical charge of the onboard battery 47. As preventive maintenance procedure it is necessary to inspect the moving parts for erosion and simultaneously recharge the onboard battery 47 with household electricity each time the electric vehicle 55 has completed a 1,000 miles journey. Another option is to replace the onboard battery 47 with fresh battery using the snap-on anchor 127 in the battery compartment 3 which takes less than 15 minutes of installation time at the battery station along the highway.

The operating advantages of the electric vehicle 55 are as follows: (i) The durable rustproof body 2 will operate more than 70 years and save lives on the highway. (ii) It will incur great savings in fuel expenses and maintenance expenses. (iii) It will alleviate air pollution and give people clean air to breathe, good health and economic prosperity. (iv) The shock absorber 7, FIG. 2 will produce high bounce of the wheel 49B and minuscule bounce of the body 2. (v) The energy converter 99 will store large quantities of electric current into the battery 47 without imparting braking effect to the speeding electric vehicle 55. (vi) The contactor 112 will recycle repeatedly the largest concentration of kinetic energy from the threaded surface of the spinning wheel 49A to the onboard battery 47 with minuscule braking effect to the speeding electric vehicle 55. (vii) The spring 125 will provide shock absorber protection to the contactor 114 and drive belt 118. (viii) The drive belt 118 will not get loose during transit because the drive shafts 101 and 104 are co-axial about the 126-126 axis. (ix) The electric vehicle 55 will achieve the most economical electric current consumption at high cruising speed on highways containing mostly flat and downhill distances. (x) By operating cooperatively the energy converter 99 and energy recycler 100 will enable the electric vehicle 55 to travel 1,000 miles without exhausting the electrical charge of the onboard battery 47.

Other configurations, similarities, changes and modifications can be made to the embodiment but they will still be within the scope of the present invention.

I claim:

1. An electric vehicle for traveling long distances comprising:
   a body having a drive train;
   an onboard battery inside said body;
   four wheels mechanically attached to said body;
   an onboard energy converter inside said body, wherein said energy converter further comprises:
   a lever arm mechanically connected to each said wheel;
   a toothed gear mechanically connected to said lever arm;
   a pair of circular gears intermeshed with said toothed gear; and
   a flywheel mechanically connected to a power generator, and
   an onboard energy recycler.

2. The vehicle according to claim 1 wherein said energy recycler further comprises:
   a contactor mechanically connected to said flywheel;
   a power generator mechanically connected to said contactor.

3. The vehicle according to claim 1 further comprising:
   a plurality of drive pulleys are connected to a plurality of drive shafts; and
   a plurality of drive belts are connected to a plurality of drive pulleys.

* * * * *